United States Patent

[11] 3,571,491

| [72] | Inventor | Henry J. Markowski<br>Scotia, N.Y. |
|---|---|---|
| [21] | Appl. No. | 754,712 |
| [22] | Filed | Aug. 22, 1968 |
| [45] | Patented | Mar. 16, 1971 |
| [73] | Assignee | General Electric Company |

[54] ELECTRICAL INSULATING COMPOSITIONS OF POLYESTER RESIN, EPOXY RESIN, POLYVINYL ACETAL RESIN AND FINELY DIVIDED FILLER
7 Claims, No Drawings

[52] U.S. Cl. .................................................. 174/121,
117/232, 252/63.2, 252/64, 161/185, 260/40,
260/835, 260/873
[51] Int. Cl. ...................................................... H01b 3/40,
H01b 3/42, H01b 3/44
[50] Field of Search .......................................... 252/63, 64,
63.2; 174/110.9, 120.4, 120, 121; 117/232, 122
(PBU); 260/835, 40, 837

[56] References Cited
UNITED STATES PATENTS

| 2,683,131 | 7/1954 | Cass .............................. | 260/835 |
|---|---|---|---|
| 2,691,007 | 10/1954 | Cass .............................. | 260/835 |
| 2,707,204 | 4/1955 | Richardson et al. .......... | 174/110 |
| 2,909,495 | 10/1959 | Rosenberg..................... | 161/185X |
| 3,027,279 | 3/1962 | Kurka et al. ................... | 117/232 |
| 3,239,598 | 3/1966 | Olson et al..................... | 174/120 |
| 3,340,212 | 9/1967 | Tomita........................... | 117/232 |
| 3,342,780 | 9/1967 | Meyer............................ | 260/75 |

*Primary Examiner*—John T. Goolkasian
*Assistant Examiner*—D. J. Fritsch
*Attorneys*—Howard I. Schlansker, Frank L. Neuhauser, Oscar B. Waddell and Melvin M. Goldenberg

ABSTRACT: Acid-rich polyester epoxy resin compositions containing polyvinyl acetal and finely divided filler are characterized by improved mechanical and electrical qualities and are useful as coating and impregnating compositions for tapes.

ELECTRICAL INSULATING COMPOSITIONS OF POLYESTER RESIN, EPOXY RESIN, POLYVINYL ACETAL RESIN AND FINELY DIVIDED FILLER

COMPOSITIONS

This invention relates to new and improved electrical insulating materials. More particularly, the invention relates to new and useful electrical insulating materials which are characterized by improved mechanical and electrical properties.

Polyester resin base materials as well as combinations of such materials with epoxy resins in electrical insulating applications are well known. Also well known are such polyester-epoxy resin compositions which can be dried to a relatively nontacky surface, when applied to tapes and the like and later suitably cured to a final infusible state. However, it has been generally found that the combination of good mechanical and electrical qualities in one material has been difficult to maintain. While it is relatively easy to obtain materials which, when applied to tapes and dried, are flexible and mechanically desirable such materials when converted to the final infusible state have been found to be wanting in electrical properties. Likewise, materials designed to give good electrical properties have been found lacking in mechanical properties. It is accordingly a primary object of this invention to provide electrical insulating materials which in their dried, uncured and cured state are possessed of improved mechanical properties and which have good electrical properties and flexibility when cured, such materials being useful as coating and impregnating materials for various structures, including tapes, and for the preparation of potting compounds, fillers, putties and the like.

Briefly, the present invention comprises a blend of an acid-rich saturated polyester-epoxy resin-polyvinyl acetal material and finely divided filler.

Those features of the invention which are believed to be novel are set forth with particularity in the claims appended hereto. The invention will, however, be better understood and further advantages and objects thereof appreciated from a consideration of the following description.

Typically, the acid-rich polyester of the present invention is prepared from about 20 to 50 mole percent of a saturated aliphatic acid such as adipic acid, up to 25 mole percent of an aromatic acid such as isophthalic acid, 35 to 45 mole percent of a diol typified by propylene glycol, and from about 1 to 10 mole percent of a triol typified by trimethylol propane along with a trace of a material such as triphenyl phosphite as a catalyst.

Useful as saturated aliphatic acids in addition to adipic acid are sebacic, azelaic, suberic, and dodecanoic acids, among others, having a carbon chain length generally of at least two which will occur to those skilled in the art. Useful in lieu of the isophthalic acid is terephthalic acid or mixtures of the iso- and terephthalic acids as well as lower alkyl esters of these acids. Any of the usual αω aliphatic diols having a carbon chain length of from about 2 up to about 15, preferably 2 to 5, are useful including, among others in addition to propylene glycol, the neopentyl, ethylene, 1,4-butane and other diols and mixtures thereof. Useful in admixture with or in lieu of the trimethylol propane are glycerine, tris (2-hydroxyethyl) isocyanurate (THEIC), trimethylol ethane, sorbitol, mannitol, pentaerythritol, diglycerol, dipentaerythritol, and mixtures thereof.

Any of the usual epoxy or ethoxyline resins having 1,2 epoxy groups are useful in connection with the present invention. Included are the usual Bisphenol-A, diglycidyl ether epoxy resins as well as those derived from polyolefin or glycerides or oils. Such resins are well known in the art. Among other useful epoxy resins are the so-called epoxy novolac resins and cycloaliphatic epoxy resins. Among the specific useful epoxy resins are Epon 828 of the Shell Chemical Company which is a liquid diglycidyl ether of Bisphenol-A having an epoxy equivalent weight of from 185 to 192. Epon 1002 is a normally solid Bisphenol-A diglycidyl ether reaction product having an epoxide equivalent weight of from about 875 to 1025. Epoxy novolac resins are typified by Dow DEN 438 which has an epoxide equivalent weight of about 175 to 182. Also useful are cycloaliphatic epoxy resins such as Union Carbide ERLA 4221 with an epoxide equivalent weight of 126 to 140 and ERLA 4201 having an epoxide equivalent weight of from about 145 to 156.

Typical of the polyvinyl acetal materials useful in connection with the present invention is a material sold as "Formvar 7/ 95E" by the Shawinigan Resins Corporation. This material contains from about 5 to 6.5 percent by weight hydroxyl expressed as percent polyvinyl alcohol and 9.5 to 13 percent acetate expressed as polyvinyl acetate and about 82 percent formal content expressed as polyvinyl formal. The molecular weight of this material ranges on the average from about 16,000 to 20,000 and the specific gravity is 1.227. Another material of this type useful in the present connection is "Formvar 15/ 95E." This material has a molecular weight of from about 24,000 to 40,000, a hydroxyl content expressed as percent polyvinyl alcohol of 5.0 to 6.0 percent, an acetate content expressed as percent polyvinyl acetate of from 9.5 to 13.0 percent and a formal content expressed as percent polyvinyl formal of about 82 percent and a specific gravity of 1.227. Also useful are mixtures of such materials.

Preferred among the finely divided metal oxide fillers is a fumed silica such as Cab-O-Sil made by the Godfrey L. Cabot Company. Also useful are Micro-Cel silicates prepared by Johns-Manville Company, Attagel claylike materials of the Minerals and Chemicals Corporation, bentonite, and other thixotropy inducing materials which will occur to those skilled in the art.

The following examples illustrate the preparation of the various components of the present invention and the components thereof and are not to be taken as limiting in any way. All parts, unless specifically designated otherwise, are in parts by weight.

EXAMPLE 1

A polyester having a hydroxyl to carboxyl ratio of 1 to 1.081 was prepared by reacting together 547 parts adipic acid, 224 parts isophthalic acid, 317 parts propylene glycol, 43 parts trimethylol propane, and 1.7 parts triphenyl phosphite as a catalyst for 18 hours at 225° C. or until the material had an acid number of 76.3 and a theoretical acid equivalent weight based on carboxyl of 1077.

EXAMPLE 2

Example 1 was repeated using in lieu of the trimethylol propane 83.4 parts THEIC, the reaction being carried to the point where the acid number was 78.3. The hydroxyl to carboxyl ratio was 1 to 1.09. The theoretical acid equivalent weight based on carboxyl was 1121.

EXAMPLE 3

Example 1 was repeated using 485 parts sebacic acid, 398 parts isophthalic acid, 243 parts propylene glycol, 78.3 parts trimethylol propane and 1.2 parts triphenyl phosphite, the resulting material having an acid number of 56 and a hydroxyl to carboxyl ratio of 1 to 1.32.

Generally speaking, in accordance with the present invention there are combined from 30 to 90 parts, preferably from 45 to 65 parts, acid-rich polyester, from 10 to 70 parts, preferably from 35 to 55 parts, of the epoxy resin along with 50 to 250 parts, preferably 100 to 200 parts, of polyvinyl acetal solution and 0.1 to 10 parts, preferably 0.5 to 3 parts, of the finely divided filler along with the usual amounts of epoxy resin curing accelerator, if desired, normally 0.5 to 5 percent, preferably 1 to 3 percent based on the epoxy resin weight. The polyvinyl acetal solution used is a 10 percent by weight solution of polyvinyl acetal, specifically Formvar 15/ 95E, in a solution of 60 percent by weight toluene, 40 percent by weight ethanol. Other concentrations can be used to provide the required amount of polyvinyl acetal. The following examples illustrate the preparation of intermediates for the coating compositions of the present invention.

EXAMPLE 5

There were combined 60 parts of the acid-rich polyester of example 2, 40 parts of DEN 438 epoxy novolac resin, 67 parts of toluene and 0.40 part of stannous octoate as an accelerator.

EXAMPLE 6

There were combined 50 parts of the acid-rich polyester of Example 2, 25 parts DEN 438 epoxy novolac resin and 25 parts Epon 1002, 67 parts of toluene and 1.0 part stannous octoate.

EXAMPLE 7

There were combined 48.5 parts of the acid-rich polyester of example 2, 51.5 parts of a mixture of equal parts by weight of Epon 1002 and 1004, 67 parts toluene and 1.03 parts stannous octoate.

To the materials of examples 5, 6 and 7 above there were added varying amounts of fumed silica and polyvinyl acetal, or both, the resulting materials being coated on steel panels and cured at 160° C. for 10 hours. The dissipation factor and capacitance of the cured material were measured at 10 volts/mil and 130° C. Shown in Table I below are the results of the testing of such materials.

TABLE I

| Example | Resin example | Parts by wt. fumed silica added | Parts by wt. polyvinyl acetal added, solids | Dissipation factor, percent | Capacitance (pf.)×100 |
|---|---|---|---|---|---|
| 8 | 5 | 1.67 | | 12.50 | 16.39 |
| 9 | 5 | | | 14.60 | 17.65 |
| 10 | 5 | 1.67 | 8.35 | 2.90 | 3.03 |
| 11 | 5 | | 8.35 | 12.10 | 4.48 |
| 12 | 5 | 1.67 | 16.70 | 4.35 | 2.92 |
| 13 | 5 | | 16.70 | 10.66 | 3.07 |
| 14 | 6 | 1.67 | | 3.90 | 9.46 |
| 15 | 6 | | | 4.44 | 10.14 |
| 16 | 6 | 1.67 | 8.35 | 1.10 | 2.98 |
| 17 | 6 | | 8.35 | 14.00 | 3.96 |
| 18 | 6 | 1.67 | 16.70 | 1.56 | 2.52 |
| 19 | 6 | | 16.70 | 21.50 | 3.01 |
| 20 | 7 | 0.84 | | 10.30 | 6.55 |
| 21 | 7 | | | 20.00 | 7.26 |
| 22 | 7 | 0.84 | 8.35 | 9.75 | 2.69 |
| 23 | 7 | | 8.35 | 82.00 | 4.97 |
| 24 | 7 | 0.84 | 16.70 | 15.14 | 2.84 |
| 25 | 7 | | 16.70 | 88.00 | 5.06 |

From the above table it will be noted that the use of polyvinyl acetal alone actually reduces the dissipation factor and capacitance of the base materials. Likewise, the use of the finely divided filler reduces the dissipation factor and capacitance values. It will be particularly noted that the use of the finely divided filler and polyvinyl acetal produces a distinct improvement in dissipation factor and capacitance as compared to those using only one of these materials or none at all.

In addition to its salutary effect on the electrical characteristics of the present invention, the addition of the polyvinyl acetal provides a material which, particularly as applied to fibrous tapes, mica paper and the like, provides in its dried but uncured state a coating which is at the same time flexible and nontacky so that the tape can readily be applied to electrical conductors or as a finishing tape for already insulated electrical conductors. Thus, materials of the present type containing no polyvinyl acetal when coated on glass cloth tapes or tapes of synthetic resin or combinations of synthetic resin and glass when dried for even 2 hours at 125° C. were still tacky and difficult to handle. On the other hand, when the polyvinyl acetal material was used in accordance with the present invention, such drying produced tapes which, while flexible, had little or no tack and were easily wrapped or wound about electrical conductors. Furthermore, the shelf life of the tapes herein is over one year. Furthermore, tapes coated and impregnated with the above materials had electrical qualities commensurate with those above. The time of cure depends on the temperature. For example, a glass tape coated with the material of example 6 when cured for 6 hours at 160° C. had a dissipation factor of 18.3 percent and a capacitance of 2.95 at 130° C. Tapes particularly of glass fabric or containing glass material coated and impregnated with the present resins, while useful as a complete electrical insulation system, in and of themselves are particularly useful as armoring tapes which can be wound about electrical conductors already insulated with usual tapes. Thus, the present materials can be used to treat mica paper insulation and also the armor tape used over the insulation.

There are provided, then, by the present invention compositions which are particularly useful for preparing electrical insulating and armoring tapes which are readily applied in their dried, uncured state and which, when cured, are characterized by good mechanical and electrical properties.

I claim:

1. An electrical insulating composition comprising an acid-rich saturated polyester comprising the reaction product of from about 20 to 50 mole percent of a saturated aliphatic acid, an effective amount up to 25 mole percent of aromatic acid selected from isophthalic acid, terephthalic acid, lower alkyl esters thereof, and mixtures thereof, from about 35 to 45 mole percent of a dial and about 1 to 10 mole percent of a triol, an epoxy resin containing 1,2 epoxy groups selected from diglycidyl ether epoxy resins, polyolefin epoxy resins, glyceride epoxy resins, oil epoxy resins, epoxy novolac resins, cycloaliphatic epoxy resins, and mixtures thereof, polyvinyl acetal and finely divided filler.

2. A composition as in claim 1 in which the ingredients are present in parts by weight in the amount of 30 to 90 parts polyester, 10 to 70 parts epoxy resin, 50 to 250 parts polyvinyl acetal as a 10 percent solvent solution, and 0.1 to 10 parts finely divided filler.

3. A composition as in claim 1 in which the ingredients are present in parts by weight in the amount of 45 to 65 parts polyester, 35 to 55 parts epoxy resin, 100 to 200 parts polyvinyl acetal as a 10 percent solvent solution, and 0.5 to 3 parts finely divided filler.

4. A tape coated and impregnated with the composition of claim 1.

5. An electrical conductor wound with a tape coated and impregnated with the composition of claim 1.

6. A composition as in claim 1 where said triol is tris (2-hydroxyethyl) isocyanurate.

7. A composition as in claim 1 comprising 50 to 90 parts of acid-rich polyester, 10 to 50 parts of liquid epoxy resin having 1,2 epoxy groups.

PO-1050
(5/69)

UNITED STATES PATENT OFFICE
CERTIFICATE OF CORRECTION

Patent No. 3,571,491            Dated March 16, 1971

Inventor(s) Henry J. Markowski

It is certified that error appears in the above-identified patent and that said Letters Patent are hereby corrected as shown below:

Claim 1, line 7, delete "dial" and substitute therefor

- diol -

Signed and sealed this 22nd day of June 1971.

(SEAL)
Attest:

EDWARD M. FLETCHER, JR.            WILLIAM E. SCHUYLER, JR.
Attesting Officer                    Commissioner of Patents